Sept. 25, 1956 R. C. MORTON ET AL 2,764,464
DIGITAL GRAPH FOLLOWER PLOTTER
Filed July 2, 1952 2 Sheets-Sheet 1
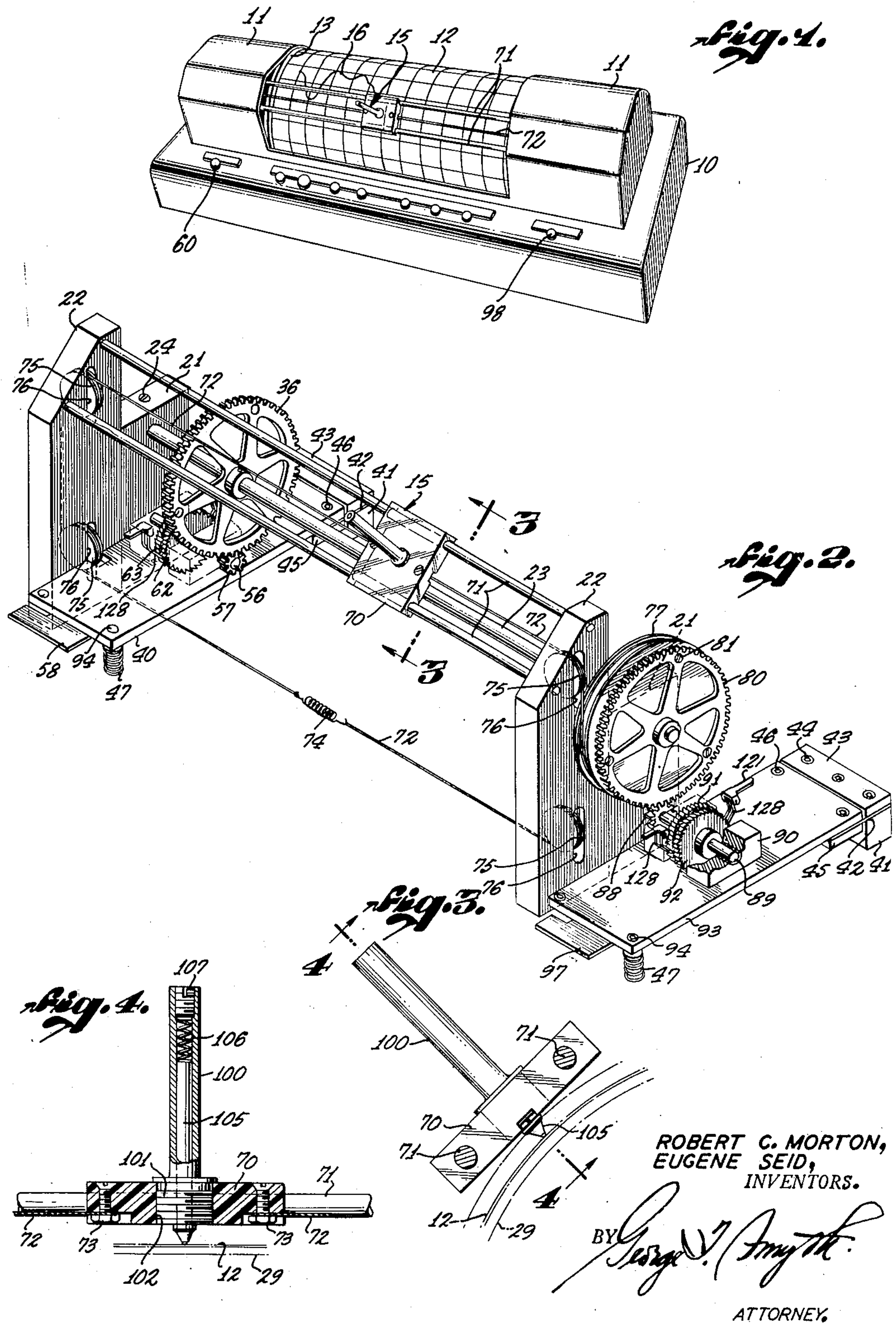
ROBERT C. MORTON,
EUGENE SEID,
INVENTORS.
BY George V. Smyth
ATTORNEY.

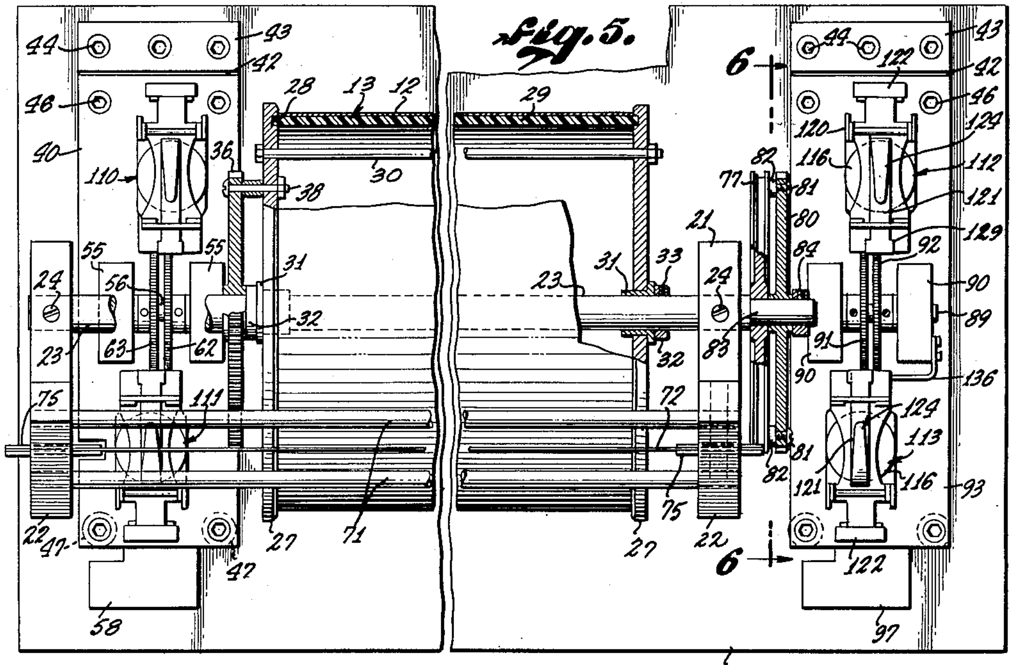
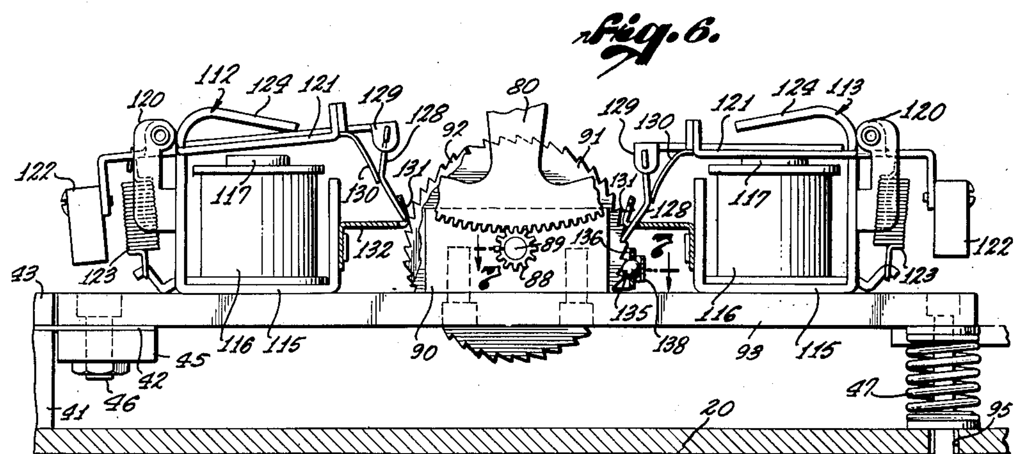
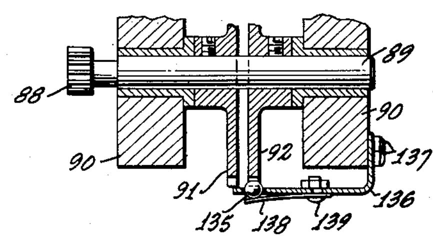
Fig. 7.
ROBERT C. MORTON,
EUGENE SEID,
INVENTORS.
BY George T. Smyth
ATTORNEY.

United States Patent Office 2,764,464

Patented Sept. 25, 1956

1

2,764,464

DIGITAL GRAPH FOLLOWER PLOTTER

Robert C. Morton and Eugene Seid, Los Angeles, Calif., assignors to North American Aviation, Inc.

Application July 2, 1952, Serial No. 296,968

6 Claims. (Cl. 346—112)

This invention relates to graph plotting and following devices and more particularly pertains to such a device for plotting and/or following $x$ versus $y$ relationships.

The device of the invention is specifically adapted to plot a graph of the $x$ versus $y$ output relationships from two digitalized sources in response to pulses transmitted by two corresponding signal circuits. It is contemplated that the device may be used either to plot a graph of the relationships in a fully automatic manner or conversely to follow a finished graph for the purpose of deriving the $x$ and $y$ values represented by the graph and for automatically generating corresponding signal pulses to record the values.

In both of these uses of the device, a suitable element follows the changing $x$ versus $y$ values on a record sheet and, for convenience, such an element may be referred to hereinafter as a follower. For plotting a graph from $x$ and $y$ data the follower will be a suitable marking device such as a stylus or pen. On the other hand, for deriving values from a finished graph, the follower will be a suitable sighting means adapted for guidance along the plotted line.

The invention is directed particularly to mechanical and electro-mechanical means for controlling the relative movement of a follower and a record sheet in an incremental manner for the above purposes. In this regard, the invention is characterized by the concept of moving the sheet incrementally in one direction in accord with changes in one of the two values and moving the follower in a direction perpendicular thereto in response to changes in the other of the two values. The invention is further characterized by the concept of using a drum to move the sheet in an arcuate path and the use of rectilinear guide means to move the follower in the perpendicular direction.

While the drum may move the sheet in the manner in which a roller moves a belt, preferably the sheet is directly attached to and carried by the drum. It is contemplated that additional sheets may be attached to the drum in overlapping relationship in the course of a plotting procedure whenever it is found that more plotting space is needed than can be accommodated by one rotation of the drum periphery.

The follower is actuated by a flexible means such as a small cable that is governed by a drive pulley and the drive pulley, in turn, is connected through a train of gears with an electrically actuated pawl and ratchet mechanism. In similar manner, the drum carrying the record sheet is operatively connected by a train of gears with another electrically actuated pawl and ratchet means.

In the preferred practice of the invention, at least one gear in each of the two gear trains is mounted on a movable support for movement into and out of engagement with the remainder of the gear train. Suitable yielding means, such as a spring, normally acts on the movable support to hold the gears in engagement. Manual retraction of one of the two supports to disengage the gears of the gear train associated therewith releases the follower for free movement independent of its pawl and ratchet mechanism and, likewise, manual retraction of the other support releases the drum for free rotation independent of its pawl and ratchet mechanism. This release feature not only permits convenient resetting of the follower and drum respectively but also makes possible a quick and convenient procedure for ruling grid lines on a record sheet, as will be explained.

2

A feature of the present preferred practice of the invention is the use of the same yielding means to eliminate backlash in the gear trains for the sake of high accuracy in the operation of the device. Only two gears are used in each gear train so that backlash among gears in a gear train can occur at only one point and the yielding means associated with the movable support exerts pressure at this point to hold the two gears in snug interengagement.

A further feature of the preferred practice of the invention is the use of a floatingly mounted ball member as a detent to yieldingly oppose operation of a pawl and ratchet means. The ball member is yieldingly mounted in a suitable socket and is dimensioned to engage a ratchet wheel. Since the ball member is freely rotatable in its socket, wear is uniformly distributed over its surface and in such an arrangement even when the ball member is worn it is effective to eliminate completely any lost motion or backlash in the pawl and ratchet mechanism.

The various features and advantages of the invention may be readily understood from the following detailed description considered with the accompanying drawings.

In the drawings, which are to be regarded as merely illustrative:

Fig. 1 is a perspective view of the presently preferred embodiment of the invention;

Fig. 2 is a perspective view of the gear trains and the associated pawl and ratchet means for moving the follower and drum respectively;

Fig. 3 is a fragmentary view showing the follower in side elevation;

Fig. 4 is a section taken as indicated by the line 4—4 of Fig. 3;

Fig. 5 is a plan view of the device with the housing removed and with some parts omitted for clarity to reveal the mechanism for operating the drum and follower;

Fig. 6 is a section on an enlarged scale taken as indicated by the line 6—6 of Fig. 5; and Fig. 7 is a section taken as indicated by the line 7—7 of Fig. 6.

As shown in Fig. 1, the presently preferred embodiment of the invention may include a suitable housing having a base portion 10 and two upright portions 11 spaced apart to expose a sheet of paper 12 on the rotary drum 13. As shown in Fig. 1, a suitable follower generally designated 15 suitably guided and controlled may be adapted to plot a graph 16 on the sheet of paper 12. It will be understood that the drum and follower may be of any suitable construction and may be actuated by any suitable arrangement within the scope of the appended claims.

As shown in Figures 2 and 5, the structure inside the housing of the device includes a base plate 20 on which is mounted a pair of spaced upright blocks or standards 21 to support the drum 13 and a second pair of upright blocks or standards 22 to support the follower 15. The drum 13 is mounted on a fixed rod or axle 23 having its two ends extending through the upright blocks 21 and anchored therein by suitable screws 24.

As best shown in Fig. 5 the drum 13 may comprise a pair of end walls or discs 27 having circular grooves 28 to receive a drum cylinder 29, the two discs being held in assembled relationship by suitable tie rods 30. Preferably, the drum cylinder 39 is made of a suitable transparent or semi-transparent plastic material. The two end discs 27 are provided with bearing members 31 by means of which the drum is journalled on the fixed rod 23 and the drum is secured against longitudinal movement by a pair of collars 32 that are anchored on the rod 23 by set screws 33.

As heretofore stated, it is contemplated that the drum 13 will be driven by suitable gearing and for this purpose a relatively large gear 36 (Fig. 2) is operatively connected with one end of the drum. The large gear 36 is journalled on the fixed rod 23 and is connected to the adjacent end disc 27 of the drum by suitable means such as a plurality of studs 38. Below the large gear 36 a support means in the form of a plate 40 is suitably mounted for movement toward and away from the large gear. In the particular construction shown, one end of the plate 40 is hingedly attached to a fixed block 41 (Fig. 2) on the base plate 20. For this purpose a flexible sheet member 42 is anchored to the block 41 by a retaining strip 43 and suitable screws 44 (Fig. 5) and, in like manner, the flexible sheet member is secured to the under side of the plate 40 by a retaining strip 45 (Fig. 2) and screws 46. The free end of the support plate 40 is yieldingly supported by at least one helical spring 47 that rests on the base plate 20. It is to be noted that the upward pressure of the spring 47 causes pinion 57 to press against gear 36 with wedging action of the meshing gear teeth that eliminates backlash.

Journalled in a pair of bearing blocks 55 on the hinged support plate 40 is a suitable drive shaft 56 carrying a relatively small pinion 57 for driving engagement with the large gear 36. Normally the pinion 57 is held in mesh with the large gear 36 by virtue of upward pressure exerted by the spring 47 on the free end of the support plate 40. Depression of the support plate 40 moves the pinion 57 out of engagement with the gear 36 and thereby frees the drum 13 for rotation independent of the drive shaft 56. For convenient manual depression of the support plate 40 the support plate may be provided with an extension 58 (Figs. 2 and 5) that lies immediately below a push button or plunger 60 in the housing base 10 (Fig. 1). Thus, the operator may release the drum 12 for free rotation merely by depressing the push button 60 against the resistance of the helical spring 47.

The drive shaft 56 has keyed thereto two ratchet wheels 62 and 63 which have their teeth respectively pointed in opposite rotary directions. The ratchet wheel 62 has its teeth pointed for clockwise ratchet operation as viewed in Fig. 2 thereby to rotate the large gear 36 counterclockwise for increasing values of $x$ and the second ratchet wheel 63 has its teeth pointed for opposite ratchet operation for decreasing values of $x$.

Means for actuating the two ratchet wheels 62 and 63 will be explained later in the description of similar mechanism for actuating the follower 15.

The follower 15 includes a carriage 70 movably mounted on suitable guides means. In the present construction the carriage 70 is a block of transparent plastic material apertured to slide along a pair of parallel guide rods 71 that are carried by the previously mentioned pair of upright blocks 22. Two ends of a flexible member in the form of a small cable 72 are connected to the block 70 by suitable screws and nuts 73 as best shown in Fig. 4. Preferably the cable 72 comprises two pieces interconnected by a suitable helical spring 74 that serves to keep the cable taut at all times. The cable 72 is guided by four guide pulleys 75 mounted in suitable slots 76 in the pair of upright blocks 22 and the cable is looped around a large drive pulley 77 for actuation of the follower.

The drive pulley 77 is operatively connected to a relatively large gear 80 by means of suitable screws 81 extending through spacer sleeves 82 (Fig. 5) and both the drive pulley and the gear are journalled for rotation on a reduced end portion 83 of the previously mentioned stationary rod 23. A suitable retaining collar 84 abuts the outer side of the gear 80. The gear 80 is normally engaged by a pinion 88 (Fig. 2) on a drive shaft 89 which is journalled in a pair of spaced bearing blocks 90 and which carries a pair of opposite ratchet wheels 91 and 92.

The bearing blocks 90 are mounted on a support plate 93 which is hingedly mounted on the base plate 20 and yieldingly supported in the same manner as the previously described support plate 40. Thus Fig. 6 shows a support plate 93 hinged at one end by a flexible member 42 and yieldingly supported at the other end by at least one helical spring 47. Preferably, each of the support plates 40 and 93 carries a long bolt 94 that extends through the spring 47 and a corresponding aperture 95 in the base plate 20 as shown in Fig. 6, the lower end of the bolt being provided with a suitable stop nut 96. The support plate 93 preferably has an extension 97 which underlies a push button 98 in the housing base 10 so that depression of the push button 98 disengages the pinion 88 from the large gear 80 to permit the follower 15 to be moved freely along the guide rod 71 independently of the drive shaft 89.

For the purpose of plotting a graph on the paper 12, the cariage 70 of the follower may be provided with a removable marking device 100, the construction of which is shown in Fig. 3 and 4. The marking device 100 comprises a tubular member with an enlarged threaded end 101 for engagement with a central threaded bore 102 in the carriage block 70. A small ball pen 105 is slidingly mounted inside the tubular structure and is urged toward the surface of the drum 13 by a small helical spring 106 which is confined between the end of the ball pen and an outer screw plug 107. For following a graph that is already plotted, a suitable slighting means (not shown) may be substituted for the marking device 100, for example, a sighting means providing a pair of cross-hairs.

It is contemplated that the two ratchet wheels 62 and 63 for operating the drum 13 and the two ratchet wheels 91 and 92 for operating the follower 15 will be actuated by suitable electro-magnetic means in response to pulses of current in appropriate control circuits. Referring to Fig. 5, an electro-magnetic means generally designated 110 advances the ratchet wheel 62 step by step for increasing values of $x$; and electro-magnetic means generally designated 111 actuates ratchet wheel 63 for diminishing values of $x$; an electro-magnetic means generally designated 112 actuates ratchet wheel 92 for increasing values of $y$; and an electro-magnetic means 113 actuates ratchet wheel 91 for diminishing values of $y$. Each of these four electro-magnetic means may be of the same construction, for example, the construction shown in Fig. 6.

In this construction each of the four electro-magnetic means includes a U-shaped frame 115 on which is mounted an electro-magnetic coil 116 having a soft iron core 117. Hingedly mounted on a bracket 120 carried by the U-shaped frame is an armature member 121 that is normally yieldingly held in an upright position when the electro-magnetic coil 116 is de-energized. Thus as shown on the left side of Fig. 6 the armature member 121 may be provided with a small counterweight 122 and may additionally be acted upon by a light spring 123 to normally seek an upper position in abutment against an overhanding stop finger 124 that is carried by the U-shaped frame 115.

A suitable actuating pawl 128 of angular configuration is hingedly mounted in a pair of ears 129 on the end of the armature member 121 for engagement with the corresponding ratchet wheel and a light leaf spring 130 is mounted on the underside of the armature member to continually press the pawl 128 outward toward the periphery of the ratchet wheel. The actuating pawl 128 extends through the slot 131 of an angular member 132 that is mounted on the U-shaped frame 115, which angular member serves as stop means to limit outward movement of the pawl when the pawl is at its normal retracted position shown at the left in Fig. 6. It will be noted that at this normal retracted position the pawl 128 is out of range of the teeth of the associated ratchet wheel.

When the electro-magnetic coil 116 is momentarily energized by a pulse of current from a corresponding control or signal circuit the armature member 121 as drawn downward against the soft iron core 117 as shown on the right side of Fig. 6 to cause corresponding downward movement of the actuating pawl 128. Because of its angular configuration the actuating pawl moving through the slot 131 of the angular member 132 engages a tooth of the associated ratchet wheel to advance the ratchet wheel by one step. When the electro-magnetic coil 116 is subsequently deenergized, the armature member 121 is raised by the light spring 123 and the associated counterweight 122 to withdraw the actuating pawl 128 to its normal retracted position.

A yielding detent to hold each pair of ratchet wheels normally stationary in the absence of actuating movement by a pawl 128 may be constructed as indicated in Figs. 6 and 7. The yielding detent includes a ball member 135 that is lightly pressed against one of the pair of ratchet wheels. Thus, as shown in Fig. 7 the ball member 135 is pressed against the periphery of ratchet wheel 92 to tend to immobilize not only ratchet wheel 92 but also drive shaft 89 and the second ratchet wheel 91. A yielding socket for the ball member 135 is provided by an angular plate 136 that is mounted on one of the bearing blocks 90 by a suitable screw 137. The angular plate 136 is apertured as shown to receive the ball member 135 in a loose manner and a light leaf spring 138 mounted on the angular plate by a suitable screw 139 retains the ball member in the aperture and yieldingly urges the ball member toward the periphery of the ratchet wheel 91. The ball member 135 is dimensioned to adequately engage the ratchet wheel between two consecutive teeth as may be seen in Fig. 6. Since the ball member is free to rotate in its socket and tends to rotate by virtue of frictional contact with the ratchet wheel, the ball member tends to wear uniformly and may wear away to substantial extent without losing its effectiveness for yieldingly immobilizing the ratchet wheel.

The operation of the device may be readily understood from the foregoing description. A record sheet 12 may be temporarily attached to the peripheral surface of the drum 13 in any suitable manner, for example, by adhesive tape. With the follower 15 equipped with the marking device 100 as shown in Fig. 1, it is apparent that a signal pulse of current delivered to the electro-magnetic means 110 will rotate the drum 13 one increment or step counterclockwise as viewed in Fig. 1 for an increased value of $x$ and a similar pulse of current delivered to the electro-magnetic means 11' will rotate the drum by one increment in the opposite direction for a decreased value of $x$. In like manner a pulse of current delivered to the electro-magnetic means 112 will rotate the large gear 80 one increment counterclockwise as viewed in Fig. 2 to move the follower 15 one increment to the right for an increased value of $y$ and in like manner energization of the fourth electro-magnetic means 113 will shift the follower 15 leftward by one increment for a decreased value of $y$. Thus pulses of current delivered to the first two electro-magnetic means 110 and 111 from one digitalized source will rotate the drum 13 in accord with changing values of $x$ and signal pulses delivered to the second pair of electro-magnets 112 and 113 from a second digitalized source will control the follower 15 in accord with changing values of $y$.

To free the drum 13 for rotation independent of the two electro-magnetic means 110 and 111 it is necessary merely to depress the push button 60, as heretofore described, and in like manner depressing push button 98 frees the follower 15 for movement independent of the second pair of electro-magnetic means 112 and 113. In effect, the mechanism operated by the push buttons 60 and 98 are releasable clutches, the clutches being released by depression of the respective push buttons. It is a simple matter, therefore, to reset the drum and the follower quickly whenever required.

To plot grid lines parallel to the $x$ axis, push button 98 is depressed to permit setting the follower 15 with the marking device 100 at a desired zone of the paper 12 and then the push button 98 is released to lock the follower in position. The push button 60 is then released to permit the drum to be rotated by hand to cause the marking device 100 to trace the corresponding grid. This operation is repeated to trace all the required grid lines parallel to the $x$ axis. In like manner, grid lines parallel to the $y$ axis may be traced by depressing the push button 98 to free the follower and then moving the follower to trace a line while the drum is stationary. To reset the drum for the successive lines parallel to the $y$ axis, it is merely necessary to depress the push button 60 and rotate the drum to the position fo reach horizontal grid line.

To use the device for translating a completed graph into corresponding $x$ and $y$ values, a sighting means is substituted for the marking device 100 and the four electro-magnetic means are energized by signal pulses in a manner to cause the sighting device to follow the pattern of the completed graph. The pulses required to follow the graph may be suitably recorded, for example on a tape, for further reference or subsequent computation.

A typical embodiment of the invention provides within the scope of one rotation of the drum 13 a plotting area of 18 in. measured circumferentially of the drum by 12 in. measured longitudinally of the drum. The 18 inches permits 1152 incremental steps of $\frac{1}{64}$ in. in the $x$ direction and the 12 inches permits 768 incremental steps of $\frac{1}{64}$ in. in the $y$ direction. Used as either a graph plotter or as a graph follower, the device operates at speeds up to 20 steps or increments per second.

My description in specific detail of the presently preferred embodiment of the invention will suggest to those skilled in the art various changes and substitutions for carrying out my basic concepts within the scope of the appended claims.

I claim as my invention:

1. In a digital graph follower-plotter of the character described, the combination of: a rotary drum to move a record sheet in an arcuate path; pawl and ratchet means operatively connected with said drum to move the drum rotationally by increments; electro-magnetic means to operate said pawl and ratchet means; a follower to move across said sheet in accord with changing graph values; flexible means connected to said follower from opposite sides to shift the follower by increments across the sheet; pawl and ratchet means to actuate said flexible means; a relatively large gear operatively connected with said flexible means; a relatively small gear; support means carrying said small gear, said support means being movable between a normal position holding said small gear in engagement with said large gear and release position with the small gear disengaged from the large gear; yielding means normally holding said support means at its normal position; pawl and ratchet means to actuate said small gear; control means to move said support means to its release position; and electro-magnetic means to operate said pawl and ratchet means.

2. A combination as set forth in claim 1 in which said support means is hinged at one end and is yieldingly supported at its other end.

3. A combination as set forth in claim 2 in which said control means is movable against the yieldingly supported end of said support means.

4. In a digital graph follower-plotter of the character described, the combination of: a rotary drum to move a record sheet in an arcute path; a relatively large gear operatively connected with said rotary drum; a relatively small gear; support means carrying said small gear, said support means being movable between a normal position holding said small gear in engagement with said large gear and a release position with the small gear disengaged from the large gear; yielding means normally holding said support means at its normal position; control means to move said support means to its release position in opposition to said yielding means; a pawl and ratchet means on said support operatively connected with said small gear; electro-magnetic means to operate said pawl and ratchet means; a follower to move across said sheet in accord with changing graph values; flexible means connected with said follower for control thereof; a pulley to operate said flexible means; a relatively large gear operatively connected with said pulley; a relatively small gear; support means carrying said small gear, said support means being movable between a normal position holding said small gear in engagement with said large gear and a release position with the small gear disengaged from the large gear; yielding means normally holding said second support means at its normal position; control means to move said support means to its release position; pawl and ratchet means on said support means to operate said second small gear; and electro-magnetic means on said second support means to operate said second pawl and ratchet means.

5. A combination as set forth in claim 4 which includes a ball member adjacent each of said pawl and ratchet means and includes a corresponding yielding means to urge the ball member against the pawl and ratchet means to yieldingly immobilize the pawl and ratchet means.

6. In a digital graph follower-plotter of the character described, the combination of: a rotary drum adapted to carry a record sheet on its circumferential surface; a pair of guide rods positioned adjacent the periphery of the drum longitudinally thereof; a follower movably mounted on said guide rods; flexible means connected to said follower from opposite sides; guide pulleys to hold said flexible means in alignment; a drive pulley engaging a loop of said flexible means for actuation thereof; pawl and ratchet means for actuating said drive pulley; a plurality of gears operatively connecting said pawl and ratchet means with said drive pulley, said gears being separable to free the guide pulley from the pawl and ratchet means; manually operable means to separate said gears; electro-magnetic means to operate said ratchet means; a second pawl and ratchet means to rotate said drum; a plurality of gears operatively connecting said second pawl and ratchet means with said drum; said second plurality of gears being separable to release the drum from said pawl and ratchet means; manually operable means to separate said second plurality of gears; and electro-magnetic means to operate said second pawl and ratchet means.

References Cited in the file of this patent

UNITED STATES PATENTS

| | | |
|---|---|---|
| 1,285,169 | Hess | Nov. 19, 1918 |
| 1,320,291 | Swan | Oct. 28, 1919 |
| 2,099,616 | Muck et al. | Nov. 16, 1937 |
| 2,255,835 | Townsend | Sept. 16, 1941 |
| 2,346,802 | Walker | Apr. 18, 1944 |
| 2,390,178 | Rutherford | Dec. 4, 1945 |
| 2,397,777 | Colman | Apr. 2, 1946 |
| 2,496,552 | Lewis | Feb. 7, 1950 |
| 2,569,328 | Omberg | Sept. 25, 1951 |

FOREIGN PATENTS

| | | |
|---|---|---|
| 36,739 | Norway | Feb. 5, 1923 |
| 324,816 | Germany | July 16, 1921 |
| 334,986 | Germany | July 30, 1921 |